United States Patent
Brooksby et al.

(12)

(10) Patent No.: US 6,462,673 B1
(45) Date of Patent: Oct. 8, 2002

(54) ASYMMETRIC-RATE COMMUNICATION METHOD AND SYSTEM FOR REMOTE DATA COLLECTION

(75) Inventors: Glen W. Brooksby, Glenville; Daniel Arthur Staver, Scotia, both of NY (US)

(73) Assignee: General Electric Company

( * ) Notice: Subject to any disclaimer, the term of this patent is extended or adjusted under 35 U.S.C. 154(b) by 0 days.

(21) Appl. No.: 09/468,169

(22) Filed: Dec. 21, 1999

(51) Int. Cl.$^7$ .............................................. G08C 19/04
(52) U.S. Cl. .............................. 340/870.11; 340/870.02
(58) Field of Search ........................ 340/870.02, 870.11

(56) References Cited

U.S. PATENT DOCUMENTS

| | | | |
|---|---|---|---|
| 4,890,316 A | | 12/1989 | Walsh et al. |
| 4,956,851 A | | 9/1990 | Wolensky et al. |
| 5,901,191 A | | 5/1999 | Ohno |
| 5,960,035 A | | 9/1999 | Sridhar |
| 6,034,623 A | * | 3/2000 | Wandel .................. 340/870.02 |
| 6,084,885 A | * | 7/2000 | Scott ......................... 370/455 |
| 6,236,676 B1 | * | 5/2001 | Shaffer et al. .............. 375/222 |

* cited by examiner

*Primary Examiner*—Timothy Edwards, Jr.
(74) *Attorney, Agent, or Firm*—Jill M. Breedlove; Enrique J. Mora; Beusse Brownlee Bowdoin & Wolter PA

(57) ABSTRACT

An asymmetric-rate communication method and system for remote data collection using a processor-operated modem at a respective data collection site is provided. The modem processor used at the data collection site may be rated to have a predetermined relatively low processing power. The method includes a first selecting step that allow for selecting a first protocol for transmitting data at a predetermined rate. The selected first protocol uses a predetermined percentage of the processing power of the processor. The method includes a second selecting step that allows for selecting a second protocol for receiving data at another predetermined rate. The selected second protocol uses another predetermined percentage of the processing power of the processor. A third selecting step allows for selecting the percentage of processing power used for receiving data to be sufficiently low relative to the percentage of processing power used for transmitting data so that the combined transmitting and receiving processing requirements are kept within the low processing power of the processor.

23 Claims, 1 Drawing Sheet

ASYMMETRIC-RATE COMMUNICATION METHOD AND SYSTEM FOR REMOTE DATA COLLECTION

BACKGROUND OF THE INVENTION

The present invention is generally related to data communication, and, more particularly, to an asymmetric-rate communication method and system for remote data collection using a processor-operated modem at a respective data collection site.

In various remote data collection situations, such as meter data reading or collecting diagnostic data of a respective machine or appliance, over phone lines using a modem, it is usually required to receive much more data from the data collection site, such as may be collected from a respective meter or respective machine, than it is transmitted to the machine or the meter. A common problem encountered with presently commercially available modems is that such modems expend almost twice the computational power of their respective digital signal processor (DSP), as may be generally indicated by the number of million of instructions per second (MIPS) that the processor is rated to execute, in receiving data than they do in transmitting the collected data. Thus, it would be desired to correct this waste of DSP processing power by receiving data at a relatively slow rate compared to the rates for transmitting the data. Although there are modem protocols or standards that support asymmetrical transmission (e.g. the ITU v.34 telecommunication standard), presently existing protocols are believed to only allow for asymmetry in the transmit/receive rates within a given protocol and, unfortunately, they do not allow for mixing distinct protocols, such as would be needed for efficient utilization of the DSP processing power. The above result is not surprising since such known protocols that may support asymmetric rates are not designed for optimizing DSP processing power and, consequently, there is little benefit, at least from the MIPS utilization standpoint, to use the presently existing asymmetric protocols to conserve processing power of the DSP. Thus, it is desirable to provide an asymmetric-rate communication method and system that is able to be adapted to make efficient use of DSP processing power based on the characteristics of the remote data collection, such as may be encountered in collecting meter data, e.g., data measuring electric power consumption or water consumption, etc., or in collecting diagnostic data from machines that may be remotely located relative to one another and to a remote service center where the meter data and/or diagnostic data may be further processed.

BRIEF SUMMARY OF THE INVENTION

Generally speaking the present invention fulfills the foregoing needs by providing an asymmetric-rate communication method for remote data collection using a processor-operated modem at a respective data collection site. The modem processor used at the data collection site may be rated to have a predetermined relatively low processing power. The method includes the following steps:

selecting a first protocol for transmitting data at a predetermined rate, the selected first protocol using a predetermined percentage of the processing power of the processor;

selecting a second protocol for receiving data at another predetermined rate, the selected second protocol using another predetermined percentage of the processing power of the processor; and selecting the percentage of processing power used for receiving data to be sufficiently low relative to the percentage of processing power used for transmitting data so that the combined transmitting and receiving processing requirements are kept within the rated processing power of the processor.

The present invention further fulfills the foregoing needs by providing a modem communication system configured to provide asymmetric-rate communication for remote data collection. The system includes a modem at each of a respective plurality of data collection sites. Each modem at each of the respective data collection sites using a respective processor rated to have a predetermined processing power. The system further includes a modem at a remote service center using a respective processor rated to have another predetermined processing power. The remote service center modem may be coupled to communicate with each modem at the respective plurality of data collection sites. The processing power of the processor modem at the data collection site may have a relatively low processing power relative to the processing power of the processor modem at the service center. The respective modem processor for each data collection site in turn includes a first processor module configured to use a first protocol for transmitting data at a predetermined rate. The first processor module uses a predetermined percentage of the processing power of the processor modem at the data collection site. The modem processor at the data collection site further includes a second processor module configured to use a second protocol for receiving data at another predetermined rate. The second processor module uses another predetermined percentage of the processing power of the processor modem at the data collection site wherein the percentage of processing power used for receiving data is chosen to be sufficiently low relative to the percentage of processing power used for transmitting data so that the combined transmitting and receiving processing requirements of the modem processor at the data collection site may be kept within its relatively low processing power.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
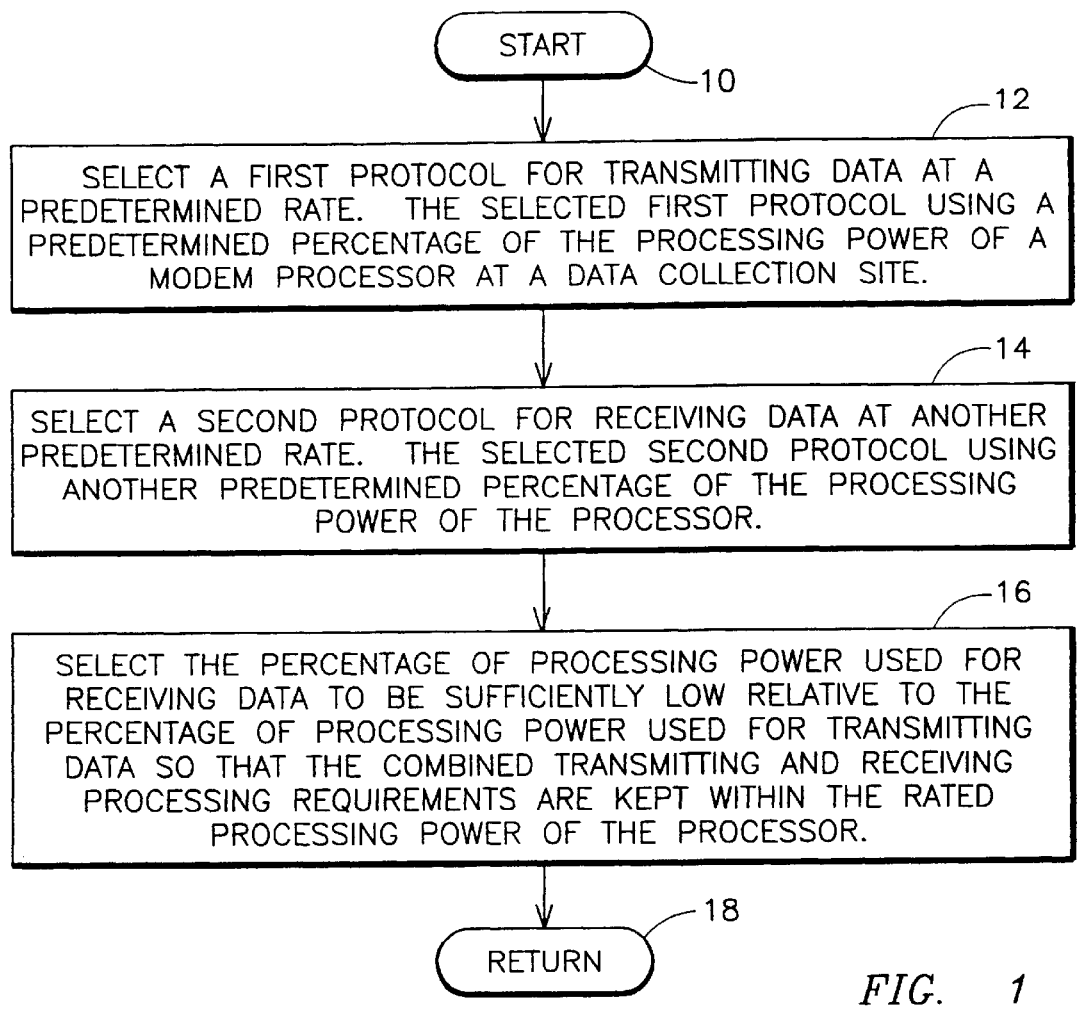
FIG. 1 is a flow chart of an exemplary embodiment of the method of the present invention.

FIG. 1 illustrates an exemplary flow chart for the method of the present invention. As suggested above, this invention uses distinct transmission and reception protocols to better utilize the DSP modem processing power (e.g., MIPS) required for data communication, e.g., meter data, diagnostic data, etc. As shown in FIG. 1, subsequently to start of operations at step 10, step 12 allows for selecting a first protocol for transmitting data at a predetermined rate. The selected first protocol uses a predetermined percentage of the processing power of the modem processor at a data collection site. Step 14 allows for selecting a second protocol for receiving data at another predetermined rate. The selected second protocol uses another predetermined percentage of the processing power of the processor. Prior to return step 18, step 16 allows for selecting the percentage of processing power used for receiving data to be sufficiently low relative to the percentage of processing power used for transmitting data so that the combined transmitting and receiving processing requirements are kept within the rated processing power of the modem DSP.

Below is described an example first illustrating results using presently known techniques, which results will then be compared with the results now achievable with the method of the present invention. Assuming a moderately-fast protocol, such as a V32 bis protocol (rated to provide maximum data rate transfers of 14.4 kilobytes per second (KBPS) ), is used both for transmit and receive, then approximately 24 MIPS would be consumed by the DSP that operates the modem. Such processing power requirements for the data transmission/reception could be implemented using a commercially available DSP chip, such as a TMS 320C203 DSP and the like. It can be shown that out of the total of 24 MIPS, then about 8 MIPS of processing power would be used for transmitting data and about 16 MIPS of processing power would be used for receiving data. On the other hand, assuming by way of example and not of limitation that a second protocol having a relatively low data rate transfer, such as a V22 protocol (rated to provide a maximum rate of 1200 BPS) or having even a lower data rate transfer, such as a Bell standard (rated to provide a maximum rate of 300 BPS), were to be used for receiving the data in lieu of the V32 bis protocol, then the MIPS, that is the DSP processing power required for receiving the data can be shown to drop to about 4 MIPS from the processing power (in this example 16 MIPS) originally required for receiving data from the service center. Under this set of assumptions, then the total MIPS required using the asymmetric-rate communication method of the present invention will result in savings of approximately 12 MIPS or about half of the original processing power of the DSP. It will be appreciated by those skilled in the art that even faster communication protocols, such as V.34, V.90, or even higher speed protocols may be chosen for the transmission rate with even higher savings in MIPS processing power. Thus, it will be appreciated that the method of the present invention allows for using at the data collection site DSP modems rated to have a lower computational or processing power than would be the case under existing techniques and this allows for using lower cost DSPs to be used or, alternatively, allows for providing additional functions at the same cost in the event the designer chooses not to use a DSP rated to have a relatively lower processing power.

Figure 2:
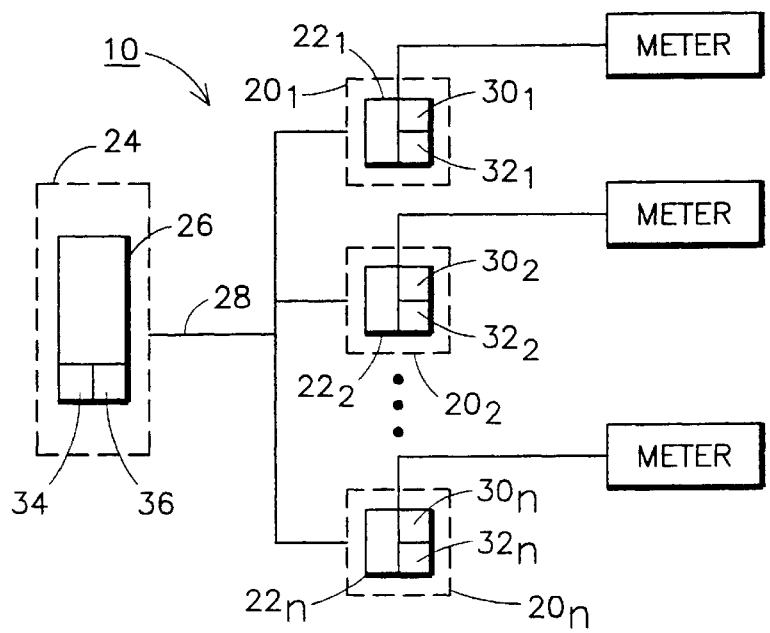
FIG. 2 is block diagram schematic of an exemplary data communication system that embodies the present invention.

FIG. 2 shows a block diagram schematic of an exemplary modem communication system embodying the present invention. As discussed above in the context of FIG. 1, the communication system is configured to provide asymmetric-rate communication for remote data collection. As shown in FIG. 2, the system includes a plurality of modems $20_1$, $20_2 \ldots 20_n$ at each of a respective plurality of data collection sites. Each modem 20 at each of the respective data collection sites uses a respective processor 22 rated to have a predetermined processing power. A modem 24 at a remote service center that receives data from each of the modems 20 uses a respective processor 26 rated to have another predetermined processing power. The remote service center modem 24 is coupled to communicate with each modem 20 at the respective plurality of data collection sites via telephone lines 28. As suggested above, the processing power of each processor modem 22 at the data collection site may be chosen to have a relatively low processing power relative to the processing power of the processor modem 26 at the service center.

By way of example, each respective modem processor 22 for each data collection site may include a respective first processor module 30 configured to use a first protocol for transmitting data at a predetermined rate. The first processor module 30 uses a predetermined percentage of the processing power of the processor modem 22 at the data collection site. A second processor module 32 is configured to use a second protocol for receiving data at another predetermined rate. The second processor module 32 uses another predetermined percentage of the processing power of the processor modem at the data collection site wherein the percentage of processing power used for receiving data is chosen to be sufficiently low relative to the percentage of processing power used for transmitting data so that the combined transmitting and receiving processing requirements of each modem processor 22 at the data collection site is kept within its relatively low processing power. It will be appreciated that the modem communication system of FIG. 2 allows for bi-directional communication between the modem 24 at the service center and each of the respective modems 20 at each of the data collection sites. It will be further appreciated that the foregoing processor modules need not be hardware modules since the operational and functional interrelationships respectively enabled by such modules can be implemented in respective software modules using well-known programming techniques to one of ordinary skill in the art. Preferably, the amount of data transferred from the service center modem 24 to any one of the data collection modems 20 should be sufficiently low relative to the amount of data transferred to the service center modem from any one of the data collection modems. Similarly, the frequency of data transfers from the service center modem to any one of the data collection modems should be sufficiently low relative to the frequency of data transfers into the service center modem from any one of the data collection modems. For example, while the transmission of data from the data collection site may occur on monthly, weekly or even daily basis, it is contemplated that the transmission of data from the service center to the data collection sites may occur much less frequently, such as may be necessary when new updates or software versions are uploaded into a meter or a machine on much infrequent basis relatively to the downloads from the respective data collection sites. Similarly, it is contemplated that the amount of data transferred from the service center to any one of the data collection modems may generally comprise short and straight-forward signal commands or instructions, as opposed to the relatively large amount of data to be collected from each of the modems at the respective data collection sites.

As further illustrated in FIG. 2, the respective modem processor 26 for the service center may include a first processor module 34 configured to use the first protocol for receiving data at the predetermined rate from any one of the modems 20 at the respective data collection sites. The processor module 26 further includes a second processor module 36 configured to use the second protocol for transmitting data at another predetermined rate to each of the modems 22 at the respective data collection sites.

It will be appreciated that the system of the present invention may be particularly cost effective since the number of data collection sites may be significantly larger than the number of service centers and hence the magnitude of the savings that can now be obtained with the present invention can be huge due to the multiplier effect caused by the large number of data collection sites. For example, the number of data collection sites could be in the millions while the number of service centers could be at most a few dozen and therefore even saving a few dollars per DSP at each data collection site can result in multi-million dollar savings.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An asymmetric-rate communication method for remote data collection using a processor-operated modem at a respective data collection site, the modem processor used at the data collection site rated to have a predetermined relatively low processing power, the method comprising:
   using a first protocol for transmitting data at a predetermined rate, the first protocol using a predetermined percentage of the processing power of the processor;
   using a second protocol for receiving data at another predetermined rate, the second protocol using another predetermined percentage of the processing power of the processor; wherein the percentage of processing power used for receiving data is sufficiently low relative to the percentage of processing power used for transmitting data so that the combined transmitting and receiving processing requirements are kept within the rate processing power of the processor.

2. The method of claim 1 wherein the data collection comprises collecting data from a respective data-source device at the data collection site.

3. The method of claim 2 wherein the data-source device is selected from the group consisting of meters, machines and appliances.

4. The method of claim 2 further comprising a step of transmitting the collected data from the device to a remote service center modem.

5. The method of claim 4 further comprising a step of transmitting from the service center modem predetermined data to the modem at the data collection site.

6. The method of claim 5 wherein the amount of data transmitted from the service center modem to the data collection modem is sufficiently low relative to the amount of data transmitted to the service center modem from that data collection modem.

7. The method of claim 5 wherein the frequency of data transfers from the service center modem to the data collection modem is sufficiently low relative to the frequency of data transfers into the service center modem from that data collection modem.

8. The method of claim 4 wherein the service center modem is configured to transmit data to the date collection modem using the second protocol and is further configured to receive data from the data collection modem using the first protocol.

9. A processor configured to provide asymmetric-rate communication for remote data collection in a processor-operated modem at a respective data collection site, the processor used at the data collection site rated to have a predetermined relatively low processing power, the processor comprising:
   a first processor module configured to use a first protocol for transmitting data at a predetermined rate, the first processor module using a predetermined percentage of the processing power of the processor; and
   a second processor module configured to use a second protocol for receiving data at another predetermined rate, the second processor module using another predetermined percentage of the processing power of the processor wherein the percentage of processing power used for receiving data is chosen to be sufficiently low relative to the percentage of processing power used for transmitting data so that the combined transmitting and receiving processing requirements are kept within the rated processing power of the processor.

10. The processor of claim 9 further comprising means for collecting data from a respective data-source device.

11. The processor of claim 10 wherein the data-source device is selected from the group consisting of meters, machines and appliances.

12. The processor of claim 10 further comprising means for transmitting the acquired data from the data collection site to a remote service center modem.

13. The processor of claim 12 further comprising means for receiving data from the service center modem.

14. The processor of claim 13 wherein the amount of data transferred from the service center modem to the data collection modem is sufficiently low relative to the amount of data transmitted to the service center modem from that data collection modem.

15. The processor of claim 14 wherein the frequency of data transfers from the service center modem to the data collection modem is sufficiently low relative to the frequency of data transfers into the service center modem from that data collection modem.

16. A modem communication system configured to provide asymmetric-rate communication for remote data collection, the system comprising:
   a modem at each of a respective plurality of data collection sites, each modem at each of the respective data collection sites using a respective processor rated to have a predetermined processing power;
   a modem at a remote service center using a respective processor rated to have another predetermined processing power, the remote service center modem coupled to communicate with each modem at the respective plurality of data collection sites, the processing power of the processor modem at the data collection site having a relatively low processing power relative to the processing power of the processor modem at the service center, the respective modem processor for each data collection site comprising:
   a first processor module configured to use a first protocol for transmitting data at a predetermined rate, the first processor module using a predetermined percentage of the processing power of the processor modem at the data collection site; and
   a second processor module configured to use a second protocol for receiving data at another predetermined rate, the second processor module using another predetermined percentage of the processing power of the processor modem at the data collection site wherein the percentage of processing power used for receiving data is chosen to be sufficiently low relative to the percentage of processing power used for transmitting data so that the combined transmitting and receiving processing requirements of the modem processor at the data collection site are kept within its relatively low processing power.

17. The system of claim 16 wherein each modem at the data collection site has means for collecting data from a respective data-source device.

18. The system of claim 17 wherein the data-source device is selected from the group consisting of meters, machines and appliances.

19. The system of claim 17 wherein each modem at the data collection site has means for transmitting the data from the data collection site to the remote service center modem.

20. The system of claim 19 wherein each modem at the data collection site has means for receiving data from the service center modem.

21. The system of claim 20 wherein the amount of data transferred from the service center modem to any one of the data collection modems is sufficiently low relative to the amount of data transferred to the service center modem from that one data collection modems.

22. The system of claim 20 wherein the frequency of data transfers from the service center modem to any one the data collection modems is sufficiently low relative to the frequency of data transfers into the service center modem from that one of the data collection.

23. The system of claim 20 wherein the respective modem processor for the service center comprises:
- a first processor module configured to use the first protocol for receiving data at the predetermined rate from any one of the modems at the respective data collection sites; and
- a second processor module configured to use the second protocol for transmitting data at the another predetermined rate to each of the modems at the respective data collection sites.

* * * * *